UNITED STATES PATENT OFFICE.

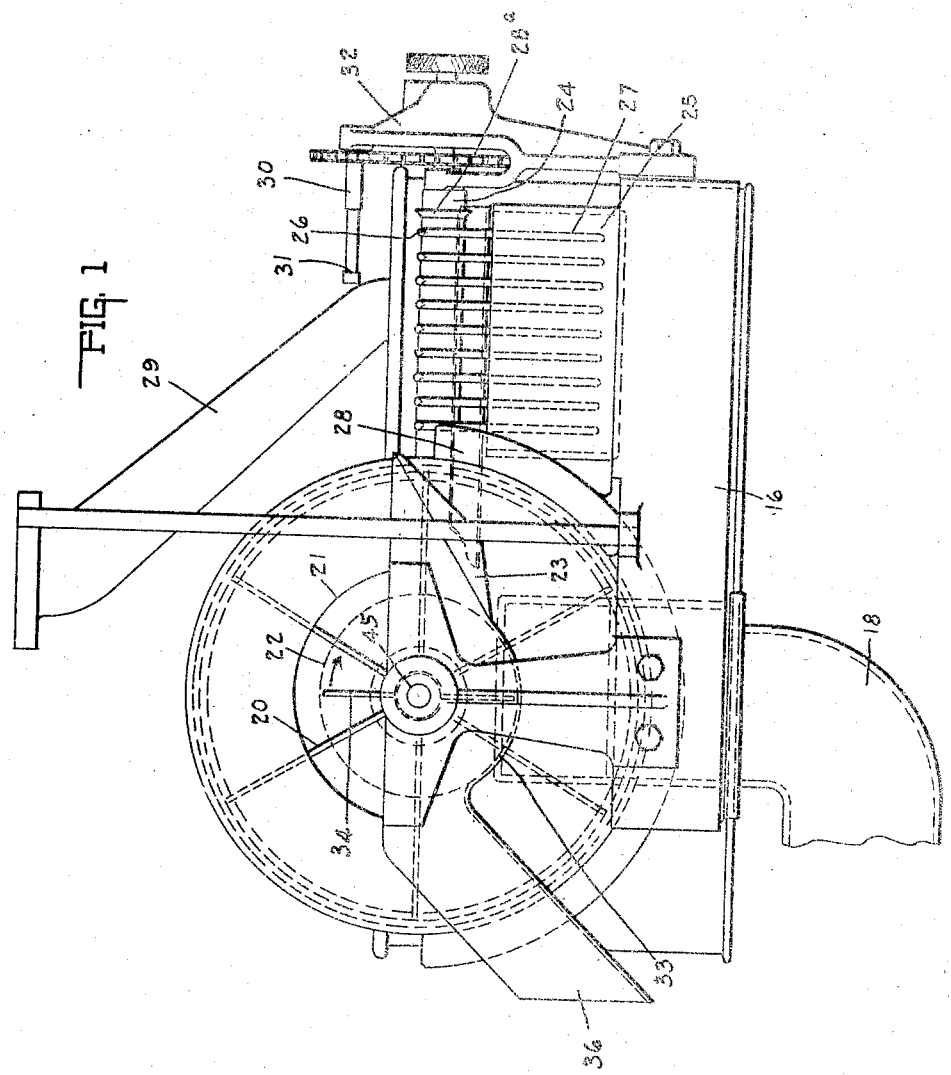

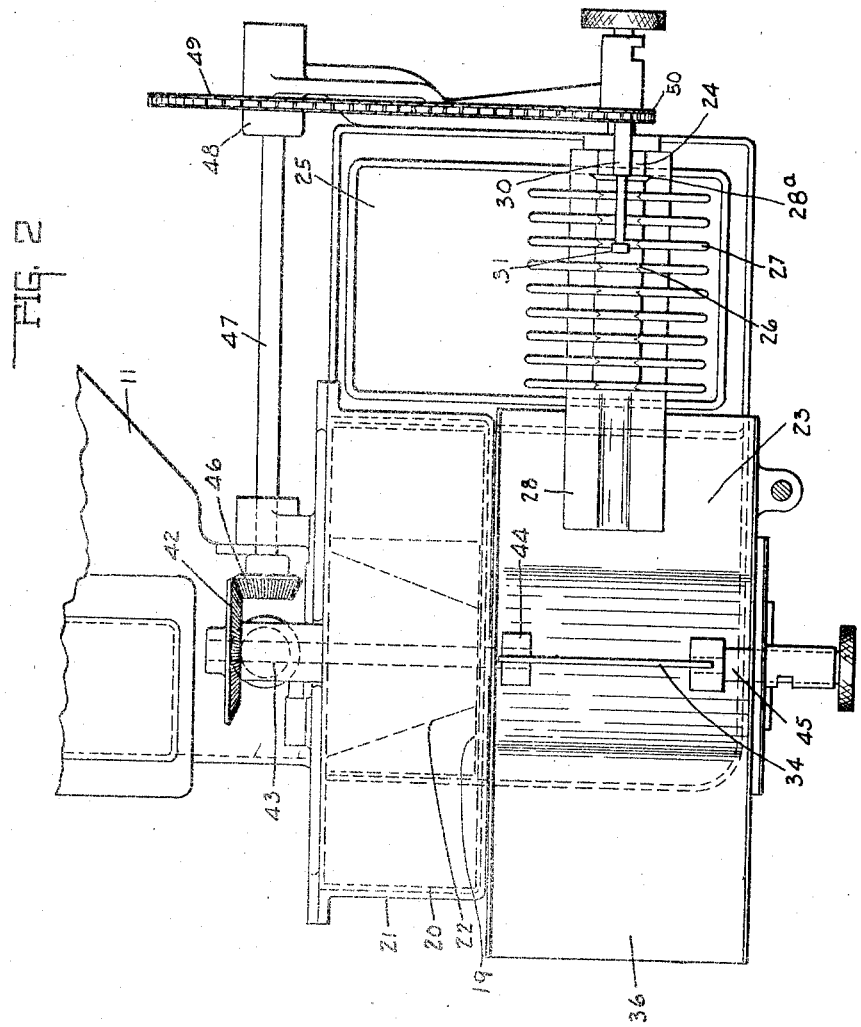

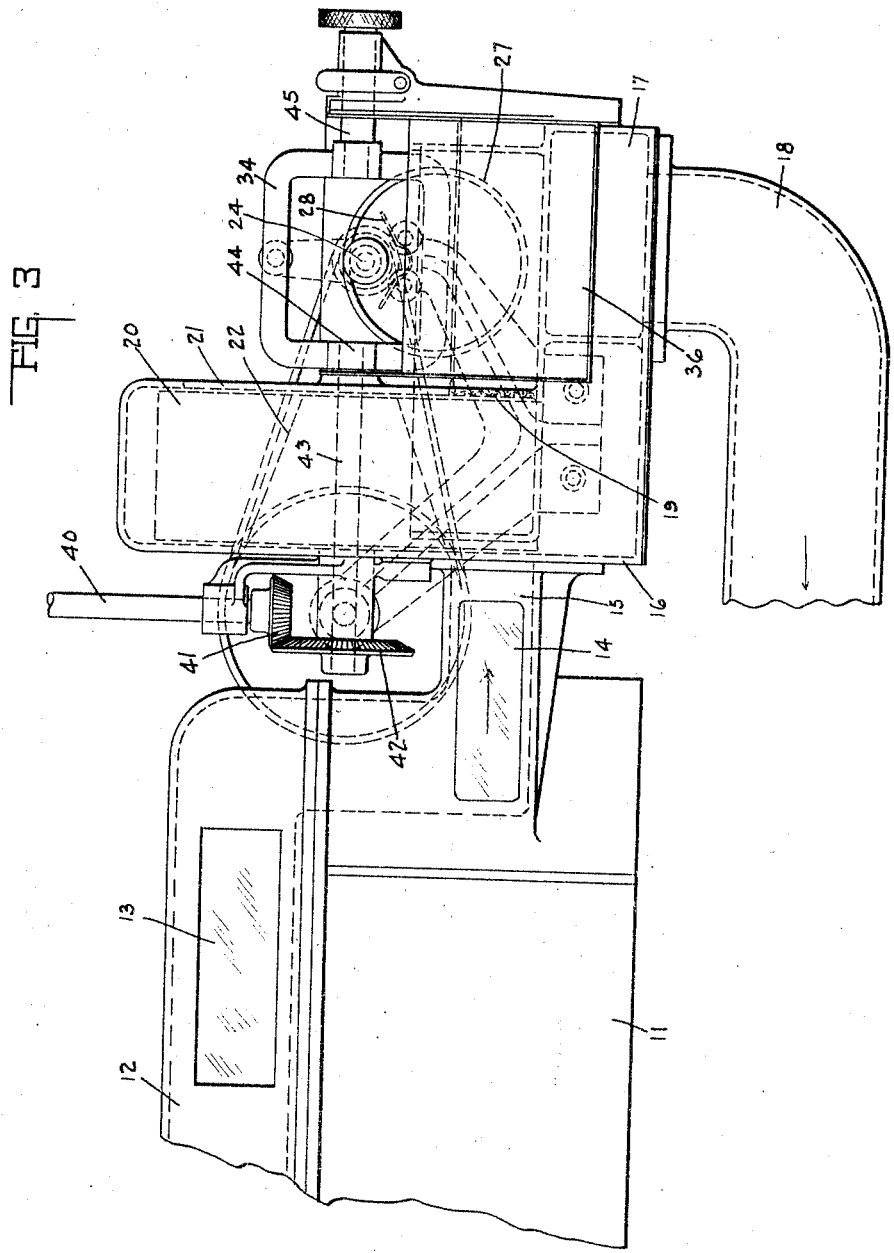

EARL C. BOOTH, OF INDIANAPOLIS, INDIANA, ASSIGNOR TO HOLCOMB AND HOKE MANUFACTURING COMPANY, OF INDIANAPOLIS, INDIANA, A CORPORATION.

BUTTERING DEVICE.

1,366,902.  Specification of Letters Patent.  Patented Feb. 1, 1921.

Application filed December 23, 1919. Serial No. 347,028.

*To all whom it may concern:*

Be it known that I, EARL C. BOOTH, a citizen of the United States, and a resident of Indianapolis, county of Marion, and State of Indiana, have invented a certain new and useful Buttering Device; and I do hereby declare that the following is a full, clear, and exact description thereof, reference being had to the accompanying drawings, in which like numerals refer to like parts.

The chief object of this invention is to provide in a confectionery machine, such as a corn popping machine, an improved device for supplying a fluid, such as butter and the like, to the confectionery to render the same more appetizing and palatable.

One feature of the invention is the provision of means for regulating the amount of fluid supplied to the confectionery.

Another feature of the invention, when the same is incorporated in a corn popping machine or the like, wherein the corn is removed from the popper by suction means, is an improved separator and conveyer for conveying the separated corn into a position to be coated with the butter.

The full nature of the invention will be understood from the accompanying drawings and the following description and claims.

In the drawings, which are made a part of this application, Figure 1 is a front elevational view of the invention. Fig. 2 is a plan view of the same. Fig. 3 is a side elevational view of the invention and a corn popper to which the invention has been added.

In the drawings 11 indicates a corn popper, such as described in the Patent No. 1,332,023, issued February 24, 1920. 12 indicates a removable head and 13 and 14 transparent windows in the same, said removable head being of air tight construction, so that suction will remove the popped corn from the popper and convey the same through a conduit 15 into the improved separator shown in the drawings. The air conveying the corn to the separator 16 passes through the lower portion thereof and returns through a chamber 17 and conduit 18 to the suction producing means not shown. A screen 19 is interposed and separates the separator 16 from the chamber 17. The corn laden air impinges upon the screen 19 and the corn is prevented from further movement with the air, the latter passing on through the screen back to the suction producing means. The corn thus accumulates in the bottom of the separator 16.

Means for removing the same herein is shown comprising a rotating wheel with a plurality of paddles 20 which elevate the corn from before the screen 19 and position the same adjacent an opening 21 also in the separator. The paddle wheel is provided, as shown in the dotted lines of Figs. 2 and 3, with discharging means, such as inclined guides 22 connecting the paddles near the hub portions. From the foregoing it will be understood that the corn which has been separated by the screen 19 is conveyed upwardly along the inner wall of the circular separator 16 by the paddles 20 until the same reaches a position where the angle of slip for the corn is reached. The corn thereupon moves axially along the paddle toward its center and is discharged from the separator by means of the inclined guides 22.

The discharged popped corn grains fall upon a buttering plate 23. Herein the means for supplying butter to the plate for buttering the corn comprises a rotating shaft 24 positioned in suitable bearings above a butter tank or container 25. The shaft 24 is suitably grooved, as at 26, and is adapted to receive butter rings 27, the latter being of sufficient diameter to rotate upon said shaft in said grooves and extend within said butter container below the level of the liquid butter in said tank. The rings carry up a film of butter and deposit the same upon the shaft. Positioned beneath said shaft is a substantially V-shaped inclined trough 28, the same being adapted to receive the butter drippings from the shaft and convey the same to the buttering plate 23. A bevel faced collar 28$^a$ is secured at one end of the shaft and prevents butter dripping anywhere but upon the trough 28.

Herein there is shown a conduit 29, the same being connected with a supply of heated liquid butter for replenishing the supply of liquid butter in the butter tank 25, as desired. If desired the butter in tank 25 may be maintained in a liquid condition by any suitable means positioned so as to heat the same in the tank.

To regulate the amount of butter to be supplied to the buttering plate, there is provided a rest 30 having a groove portion 31 adapted to receive any or all of the butter rings and maintain the same above said shaft and above the level of the butter in the tank 25. Herein the rest 30 is shown suitably supported by a bracket 32 at the desired distance above said shaft and in parallel relation thereto.

Means is provided for insuring that each popped grain of corn will receive some of the butter supplied to the plate 23. The plate is provided with a cylindrical shaped depression or pocket 33. Above said pocket there is positioned a paddle wheel 34 for rotation therein, the same engaging the popped corn grains as they are discharged from the separator 16 to move the corn over that portion of the plate 23 which receives the butter, so that the corn may be buttered. The butter not taken up by the corn passes along the plate 23 and collects in the cylindrical depression 33 from whence it is carried away by the corn passing therethrough. The plate 23 is provided with suitable side portions 35 in order to form a trough to contain and guide the corn. A suitable discharge spout or chute 36 is positioned at one end of the trough to discharge the corn into any suitable receptacle or container.

Paddle wheels 20, buttering shaft 24 and paddle wheels 34 may be rotated by any suitable means; that herein shown being a single means so that all of said means will be operated simultaneously and in timed relation with each other. A main power shaft 40 is positioned adjacent the separator 16 and carries at one end a bevel pinion 41, the same meshing with a bevel gear 42 positioned adjacent thereto. Rigid with said bevel gear 42 and rotatable thereby is a shaft 43 extending transversely of and through the separator 16. The shaft has an outwardly extending portion 44 positioned above the buttering trough. The shaft 43 carries the paddles 20 and the guides 22 and rotates the same for the purpose described. Opposite the projecting end 44 is positioned a bearing 45 extending through the side wall 35 of the buttering trough. The paddle 34 is rigidly secured to the end 44 and is mounted between said end and said bearing 45 and is rotated by the shaft 43 simultaneously with the paddles 20 in the separator.

Meshing with the gear 42 is a pinion 46, the same carried by a shaft 47 having mounted thereon a sprocket wheel 48, the same carrying a sprocket chain 49 for driving a sprocket wheel 50 mounted upon the shaft 24. The buttering shaft 24, the paddle conveyer 20 and the buttering paddle 34 are thus simultaneously driven in timed relation by the main power shaft 40 through the means just described.

The invention has been described in great detail, but it will be understood that various modifications of the same may be made without departing from the invention, and the same is not to be limited by the details of the description. While the device has been termed a buttering device, it will be understood that the separator and liquid containing means may be used for popped corn, puffed cereals and the like, and further in the place of butter, suitable syrups or other liquid coatings may be supplied for coating the corn or cereals.

In the claims buttering device and corn popping machine will be understood to refer to any liquid supplying means as described and the corn popping machine will be understood to refer to any cereal confection producing machine.

The invention claimed is:

1. A buttering device comprising a plate portion, means for supplying the butter to said plate, means for moving corn deposited upon said plate along the same to receive butter from the same, and means for regulating the amount of butter supplied to said plate.

2. A buttering device for popped corn and the like comprising a trough adapted to receive said corn and having an arcuate depression therein with the axis transverse to the trough axis, means for supplying butter to said trough at one end thereof, rotatable means positioned in said trough and axially alined in said depression for moving said corn into said trough to receive butter from said trough and from said depression, and a discharge chute connected with said trough, said rotatable means carrying said corn from said depression and discharging the same through said chute.

3. A buttering device for popped corn and the like including in combination a buttering plate upon which the popped corn may be deposited and means for supplying butter thereto comprising a rotatable shaft, a container for liquid butter positioned beneath said shaft, rings rotatable on said shaft and depending into said butter container beneath the level of the liquid butter, and means for withholding one or more of said rings from rotation upon said shaft and from said butter, whereby the amount of butter supplied to said shaft may be regulated.

4. A buttering device for popped corn and the like including in combination a buttering plate upon which the popped corn may be deposited and means for supplying butter thereto comprising a rotatable shaft, a trough positioned beneath said shaft for conveying butter drippings therefrom to said butter plate, a container for liquid butter, and a ring for supplying said shaft with butter from said container.

5. A buttering device for popped corn and the like comprising a buttering plate upon which the corn is deposited at one end, means for supplying butter to said end of said plate, said plate having a depression therein adapted to receive surplus butter supplied to said plate, means for conveying the corn from the end of said plate into and through said depression and discharging the corn from the plate, said buttering means comprising a liquid butter container, a shaft positioned adjacent thereto, and a ring positioned upon and rotatable by said shaft and in said container for supplying said shaft with butter from said container.

6. A buttering device for popped corn and the like comprising a buttering trough into which the corn is deposited at one end, means for supplying butter to said end of said trough, said trough having a depression therein adapted to receive surplus butter supplied to said trough, means for conveying the corn from the end of said trough into and through said depression and discharging the corn from the trough, said buttering means comprising a liquid butter container, a shaft positioned adjacent thereto, a ring positioned upon and rotatable by said shaft and in said container for supplying said shaft with butter from said container, and an arm positioned adjacent said shaft and adapted to receive one or more of said rings and withhold the same from said shaft and said container, whereby the amount of butter supplied by said shaft may be regulated.

7. A buttering device for popped corn and the like including a buttering plate, rotatable means for agitating the corn to receive butter from said plate and discharge the corn therefrom, butter supplying means comprising a container for liquid butter, a shaft positioned adjacent thereto and adjacent the plate and a ring rotatable upon and by said shaft and depending into said butter container, and a driving shaft for rotating said rotatable means and said shaft.

8. A buttering device for popped corn and the like, including a buttering plate, means for supplying butter to the plate, and means for depositing popped corn upon said plate comprising corn separating means positioned adjacent and extending beneath the plate, elevating means for elevating the separated and popped corn from the separating means, and means for discharging the separated corn from said elevator upon the plate, to be buttered.

9. A buttering device for popped corn and the like including in combination a buttering plate and means for supplying butter to said plate, means for depositing popped corn upon said plate comprising a rotatable shaft, a paddle wheel rotatable therewith for elevating corn to a position above said plate, and inclined guide means associated with said paddle wheel near the inner end thereof for discharging the corn elevated by said paddle wheel upon said plate.

10. A buttering device for popped corn and the like comprising a buttering trough having a depression therein adapted to receive and collect surplus butter furnished to said trough, rotatable means positioned in said trough and in said depression for conveying the corn through said trough and said depression and discharging the same therefrom after being buttered, a shaft, and a rotatable elevator positioned upon and rotatable by said shaft for discharging corn into said trough to be buttered, said shaft also rotating said rotatable conveyer.

11. In a buttering device the combination of a butter supplying shaft, a buttering plate adapted to receive butter from said shaft, a rotary elevator adapted to discharge popped corn and the like upon said plate and butter the same, rotating means positioned adjacent said plate for buttering and conveying said corn from said plate, and a driving shaft for rotating all of said rotating means.

12. A buttering device for popped corn and the like including in combination a buttering plate upon which the popped corn may be deposited and means for supplying butter thereto comprising a container for liquid butter, a shaft rotatably mounted adjacent the buttering plate, a ring depending into said container and in the butter and rotatable upon said shaft for supplying butter to said shaft, and means on said shaft for preventing the passage of butter from the same except to the buttering plate.

13. A buttering device for popped corn and the like including in combination a buttering plate upon which popped corn may be deposited, means for supplying butter thereto comprising a rotatable shaft having one end mounted adjacent said plate, a trough positioned beneath said shaft for conveying butter drippings therefrom to said buttering plate, a container for liquid butter, a ring for supplying said shaft with butter from said container, and means positioned upon the opposite end of said shaft for preventing the escape of any butter except into said trough.

In witness whereof, I have hereunto affixed my signature.

EARL C. BOOTH.